United States Patent [19]
Göbel et al.

[11] Patent Number: 4,585,110
[45] Date of Patent: Apr. 29, 1986

[54] TORSIONAL DAMPER STRUCTURE FOR A CLUTCH DISC USED IN A MOTOR-VEHICLE CLUTCH

[75] Inventors: Hilmar Göbel, Schwebenried; Harald Raab, Schweinfurt, both of Fed. Rep. of Germany

[73] Assignee: Fichtel & Sachs AG, Schweinfurt, Fed. Rep. of Germany

[21] Appl. No.: 498,231

[22] Filed: May 26, 1983

[30] Foreign Application Priority Data

May 28, 1982 [DE] Fed. Rep. of Germany ... 8215539[U]

[51] Int. Cl.⁴ ............................................. F16D 3/14
[52] U.S. Cl. ............................................... 192/106.2
[58] Field of Search ............... 192/106.2, 106.1, 70.17, 192/70.18, 89 B

[56] References Cited

U.S. PATENT DOCUMENTS

| | | | |
|---|---|---|---|
| 3,300,007 | 1/1967 | Motsch | 192/89 B |
| 3,684,070 | 8/1972 | Maucher | 192/106.2 |
| 4,121,706 | 10/1978 | Zapf | 192/106.2 |
| 4,270,644 | 6/1981 | Billet | 192/106.2 |
| 4,368,812 | 1/1983 | Steeg | 192/106.2 |

FOREIGN PATENT DOCUMENTS

| | | |
|---|---|---|
| 6915999 | 9/1970 | Fed. Rep. of Germany . |
| 880622 | 3/1943 | France . |
| 1219517 | 5/1960 | France . |
| 2171835 | 9/1973 | France . |
| 1174692 | 12/1969 | United Kingdom . |

*Primary Examiner*—George H. Krizmanich

*Attorney, Agent, or Firm*—Toren, McGeady, Stanger, Goldberg & Kiel

[57] ABSTRACT

The clutch disc for a motor-vehicle friction clutch has a hub which defines an axis of rotation and from which there projects substantially radially a hub disc so as to be secured against rotation. On the hub there is mounted, so as to be rotatable through a limited angle of rotation, a friction lining carrier which comprises two side parts which are arranged on axially opposite sides of the hub disc and which are non-rotatably connected to each other and to the carrier. In the rotational path between the side parts and the hub disc there are arranged springs which are subjected to pressure during the relative movement of the friction lining carrier and the hub. Axially on both sides of the hub disc friction rings are arranged between the hub disc and the adjacent side parts. Between one of the two friction rings and the adjacent side part there is provided a pressure ring from which there project substantially radially several arms which are stiff in the circumferential direction of the pressure ring. The arms and/or a Belleville spring bias the pressure ring towards the friction ring. The radially external ends of the arms are fastened to the adjacent side part in a play-free rigid manner, for example with separating rivets which fixedly connect the side parts together. The arms are corrugated in the radial direction so that, if the friction rings wear, the pressure ring can be displaced in the axial direction without any change in the contact force occurring despite the rigid fastening of the radially external ends of the arms. Consequently, the frictional force does not change in the event of a load change, even after a prolonged time of operation.

6 Claims, 4 Drawing Figures

TORSIONAL DAMPER STRUCTURE FOR A CLUTCH DISC USED IN A MOTOR-VEHICLE CLUTCH

BACKGROUND OF THE INVENTION

The present invention relates to a clutch disc, which is provided with a torsional vibration damper, for a motor vehicle clutch.

A clutch disc of this kind is known, for example, from DE GM No. 6 915 999. It comprises a hub for non-rotational connection to a gear shaft, a hub disc provided on the hub and cover plates, which are arranged on both sides of the hub disc. One of the cover plates is connected to friction linings for torque transmission. Between the hub disc and the cover plates there are arranged spring elements for reciprocal rotation under load. The two cover plates are assembled by means of separating rivets. Between the hub disc, on the one hand, and each of the cover plates, on the other hand, there are provided friction rings radially inside the separating rivets for producing a frictional force upon reciprocal rotation. One of said friction rings is coupled by means of radially extending torque transmitting members to the associated cover plate. The known radially extending torque-transmitting members are provided, in their radially external zones, with semi-circular openings which embrace the outside diameter of the separating rivets. Such a kind of torque transmission is not completely free from play since, one the one hand, the assembly must be effected without the use of force and, on the other hand, there may arise additionally wear during operation, changing the frictional force.

It is the primary object of the present invention to improve the known clutch disc in such a way that the torque transmission on the friction unit occurs completely free from play and that during operation wear will not reduce frictional forces, even in the event of a load change.

SUMMARY OF THE INVENTION

According to the invention, the clutch disc for a motor-vehicle friction clutch has a hub which defines an axis of rotation and from which there projects substantially radially a hub disc so as to be secured against rotation. On the hub there is mounted, so as to be rotatable through a limited angle of rotation, a friction lining carrier which comprises two side parts which are arranged on axially opposite sides of the hub disc and which are non-rotatably connected to each other and to the carrier. In the rotational path between the side parts and the hub disc there are arranged springs which are subjected to pressure during the relative movement of the friction lining carrier and the hub. Axially on both sides of the hub disc friction rings are arranged between the hub disc and the adjacent side parts. Between one of the two friction rings and the adjacent side part there is provided a pressure ring, from which there project substantially radially several arms which are stiff in the circumferential direction of the pressure ring. The arms and/or a Belleville spring bias the pressure ring towards the friction ring. The radially external ends of the arms are fastened to the adjacent side part in a play-free rigid manner, for example with separating rivets which fixedly connect the side parts together. The radially external or outer end of each arm is preferably provided with a circular opening, through which the separating rivet penetrates during the assembly of the torsional vibration damper and which, as the separating rivet is riveted together with the two cover plates and side parts respectively, is also riveted and abuts a collar or a shoulder of the separating rivet. The arms are corrugated in the radial direction so that, if the friction rings wear, the pressure ring can be displaced in the axial direction without any change in the contact force occurring despite the rigid fastening of the radially external ends of the arms. Consequently, the frictional force does not change in the event of a load change, even after a prolonged time of operation. In the circumferential direction, these arms are arranged so as to be completely secured against rotation and free from play and transmit the full torque at the slightest relative rotation between the cover plates and the hub disc.

The frictional force may be produced by an axial biassing of the arms or by a separately provided spring, more especially a Belleville spring, or by a combination of the two spring types.

The pressure ring, which corresponds approximately to the external contour of the friction rings, may be integrally formed with the arms. It is however also possible to produce the arms and the pressure ring separately and subsequently to connect them together so that they are secured against rotation. A preferred embodiment shows a mutual riveting, but it is also possible to connect the two parts, for example, by gluing or spot welding.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
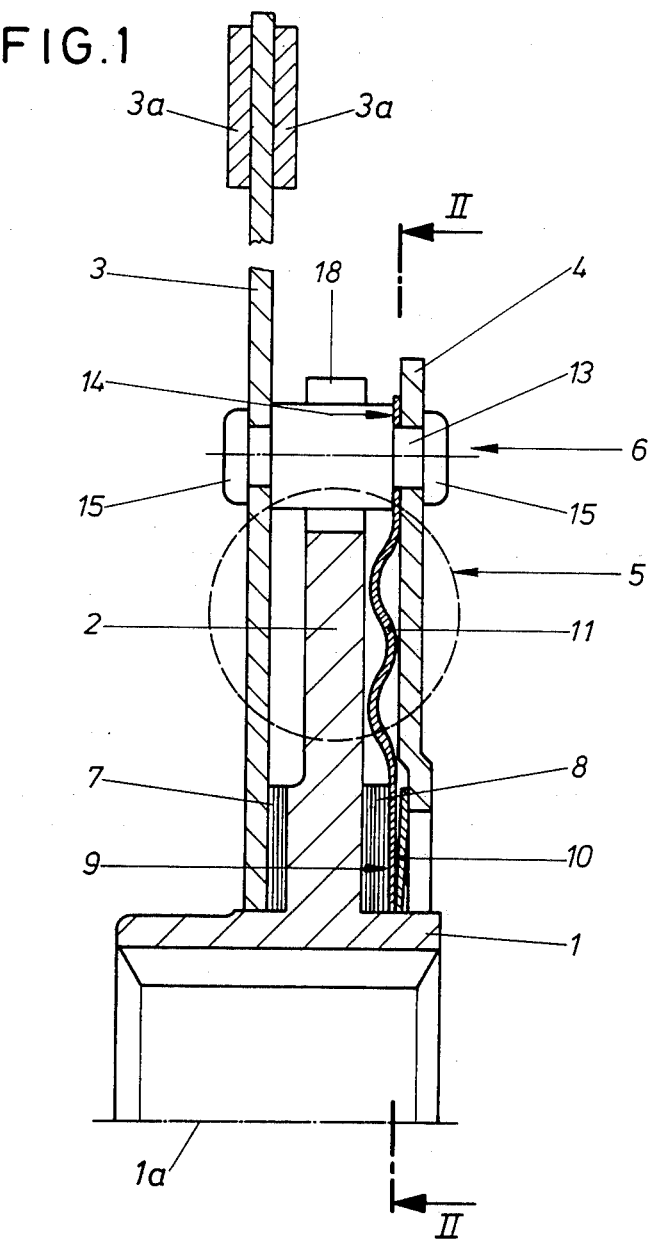
FIG. 1 shows an axial longitudinal sectional view through one half of a clutch disc, provided with a torsional vibration damper, for a motor-vehicle friction clutch.
Figure 2:
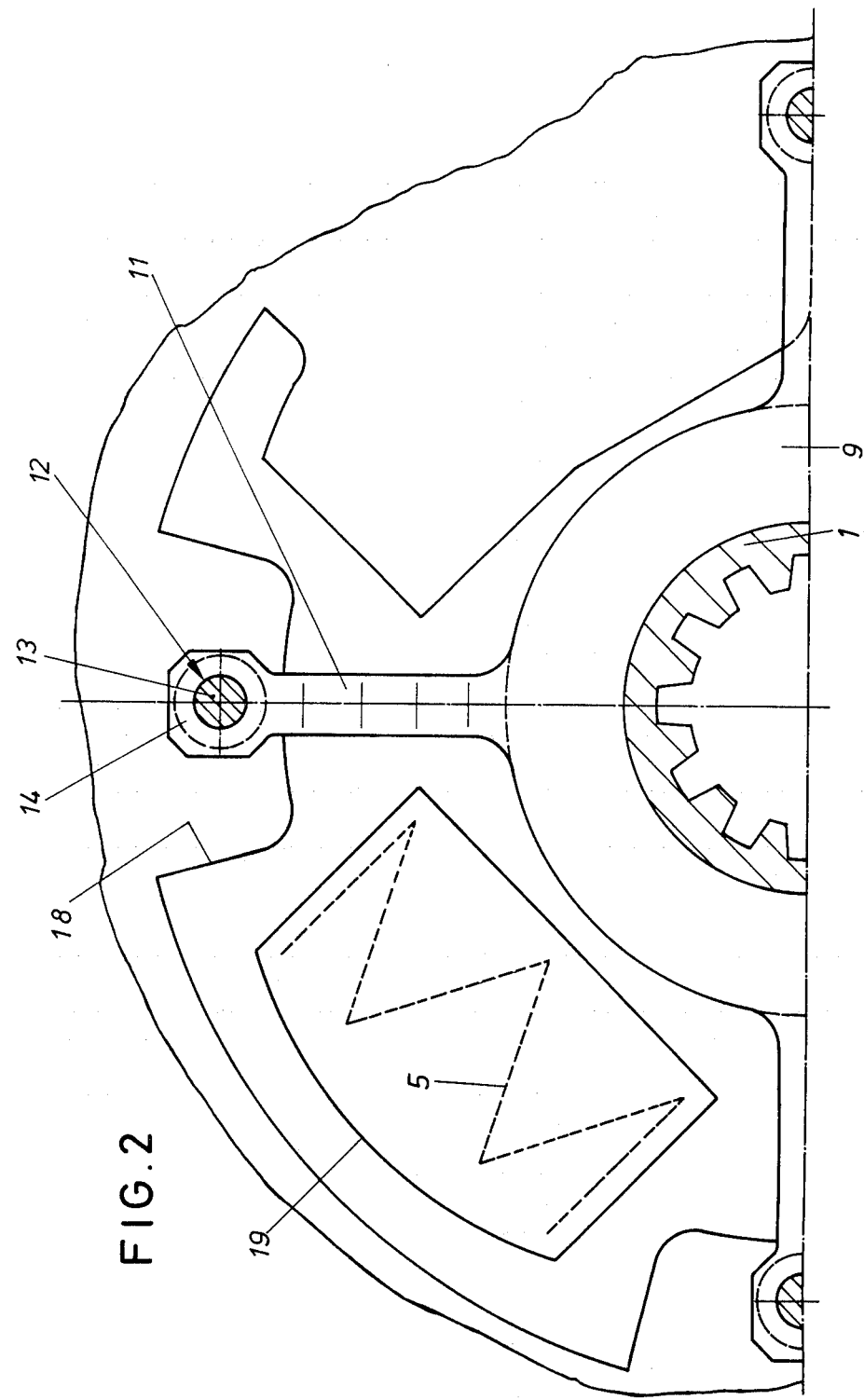
FIG. 2 shows a sectional view of this clutch disc along a line II—II in FIG. 1.

In FIGS. 1 and 2 there is partly shown a clutch disc which is provided with a torsional vibration damper and consists of a hub 1 with a hub disc 2 which is non-rotatably arranged on a gear shaft not shown and rotating about an axis of rotation 1a. On either side of the hub disc 2, there are arranged cover plates 3 and 4, of which one is connected to friction linings 3a of the clutch disc. The two cover plates 3 and 4 are non-rotatably connected together, on the one hand, and are kept at an exact axial distance from each other, on the other hand, through separating rivets 6. Shown in broken lines is one of several springs 5 which are distributed on a circumference circle and which engage in windows 19 in the hub disc 2 and in corresponding windows in the cover plates 3 and 4 so as to render possible, upon loading of the clutch disc, a mutual rotation of the cover plates and the hub disc against the force exerted by these springs. The separating rivets 6, which extend in windows 18 in the hub disc 2, serve as rotation stops. In the radially internal zone of the hub disc 2 there are provided between this disc and the cover plates 3 and 4 friction rings 7 and 8 which, on account of axial loading by a spring 10, produce a frictional force, while the hub disc and the cover plates rotate relative to one another. In order to ensure the effect of this frictional force even at the smallest angles of rotation and to prevent and frictional force interruption when the direction of rotation is reversed, there is provided between the friction ring 8 and the cover plate 4 a coupling unit which, as shown in FIG. 2, consists of a ring 9 which corresponds approximately to the shape of the friction ring 8. The ring 9 is provided with several radially extending arms 11 which have been riveted together with separating rivets 6. The arms 11 have a round opening 12 at the radially outer ends which fits exactly on a rivet shank 13 of the associated separating rivet 6. The arm 11 rests on a collar 14 of the separating rivet 6 and, with the interposition of the cover plate 4, is fastened by a rivet head 15 in a playfree manner. Each of these arms 11 is provided with a radial corrugation so as to be capable of yielding, in the event of wear of the friction ring 8, towards the hub disc 2. If the frictional force required is low, it is sufficient to provide the arms 11 with an axial bias. If this biassing force is not sufficient, then it is possible additionally to insert a Belleville spring 10 between the ring 9 and the cover plate 4. It is also possible to produce the contact force only through the Belleville spring 10.

Figure 3:
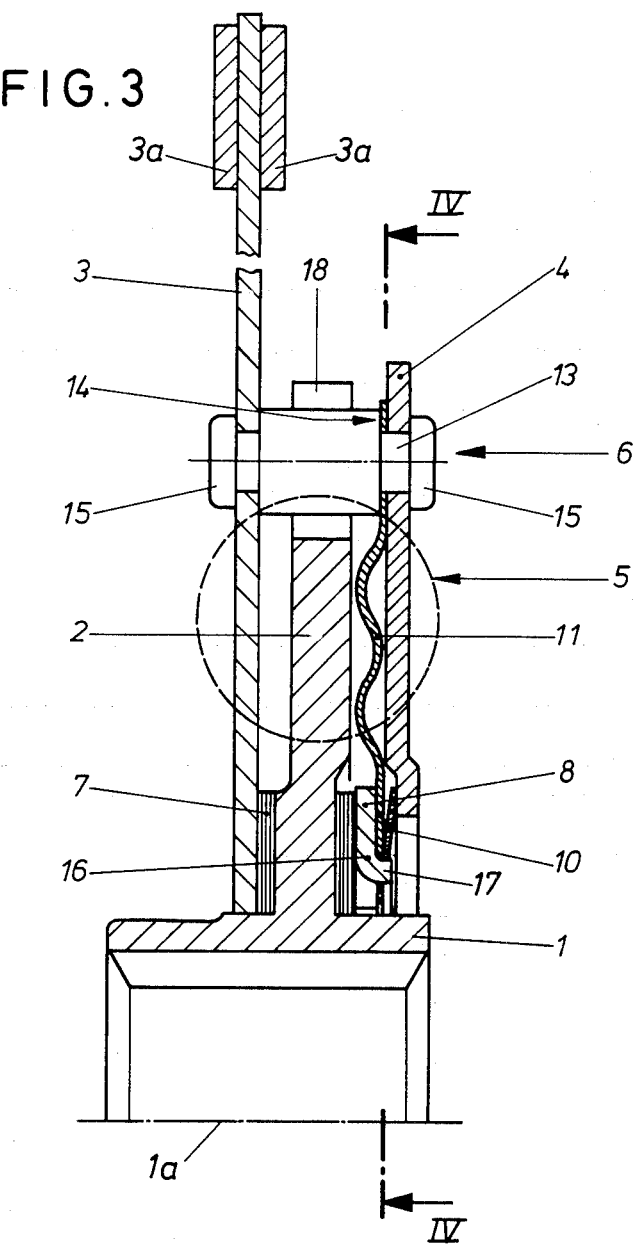
FIG. 3 shows an axial longitudinal sectional view through one half of a clutch disc, provided with a torsional vibration damper, in a modified constructional form.
Figure 4:
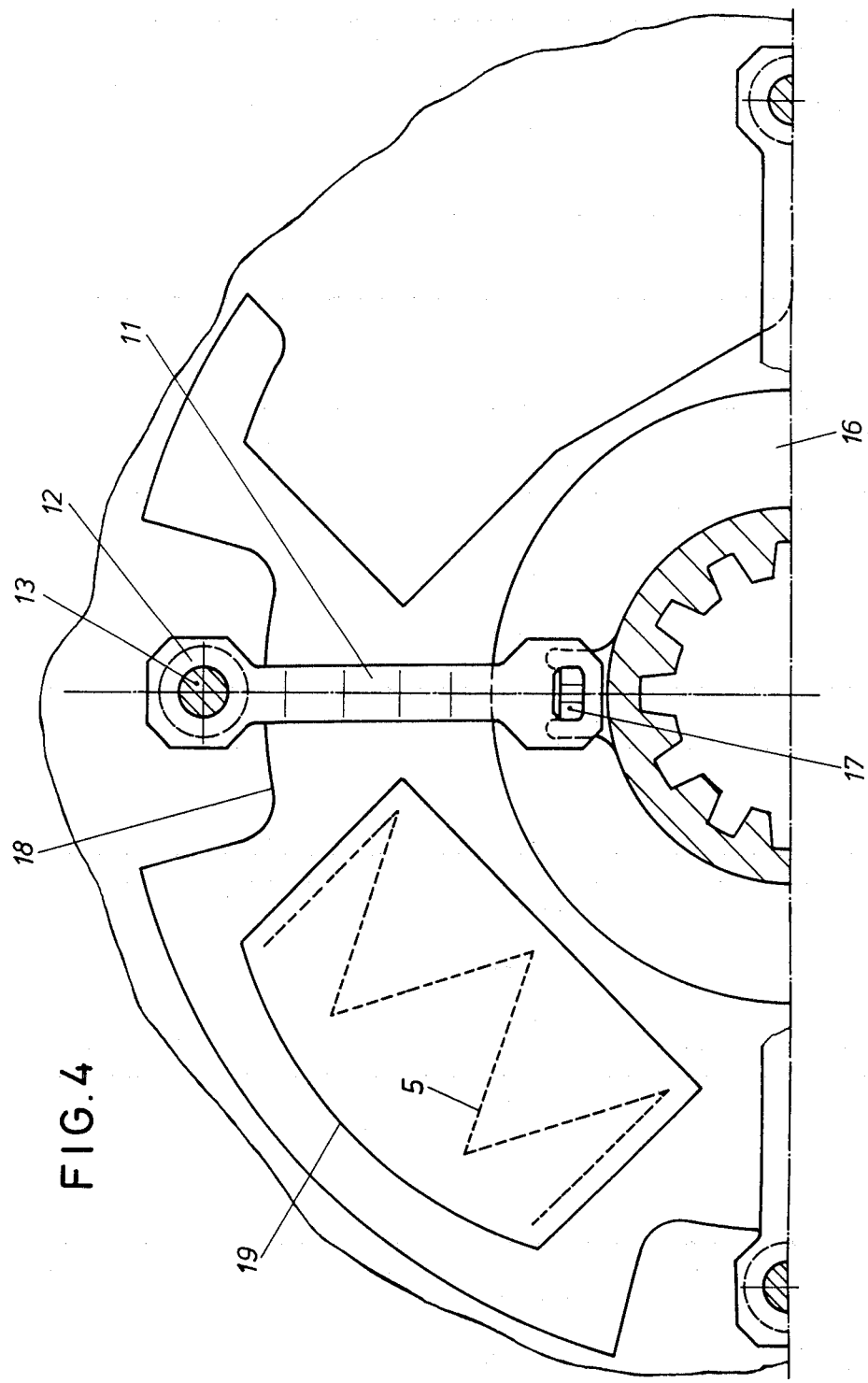
FIG. 4 shows a sectional view of this clutch disc along a line IV—IV in FIG. 3.

In FIGS. 3 and 4 there is shown a clutch disc provided with a torsional vibration damper which differs in some details from the construction shown in FIGS. 1 and 2. Only those details which are different will be pointed out hereinafter. For the rest, the function is the same.

Instead of the ring 9, which is integrally formed with the arms 11, in the construction shown in FIGS. 3 and 4 a relatively solid pressure plate 16 is provided. The pressure plate 16 has axially outwardly angled rivet extensions 17 which engage in corresponding openings in the radially internal zone of the arms 11. All the arms 11 are fixedly connected to the pressure plate 16 by upsetting, riveting or other connection methods, the radially external ends of the arms 11 being arranged, in the manner already described, with the separating rivets 6 fixedly on the two cover plates 3 and 4. Here, too, it is possible to provide a Belleville spring 10 in order to increase the axial contact force.

While specific embodiments of the invention have been shown and described in detail to illustrate the application of the inventive principles, it will be understood that the invention may be embodied otherwise without departing from such principles.

What is claimed is:

1. A clutch disc for a motor-vehicle clutch, comprising:
    a hub (1) defining an axis of rotation (1a),
    a hub disc (2) supported on said hub for rotation therewith and projecting substantially radially outwardly from said hub,
    a friction lining carrier (3, 3a, 4) mounted on said hub (1) so as to be rotatable through a limited angle of rotation relative to said hub, wherein said friction lining carrier comprises two side parts (3, 4) being arranged on opposite sides of said hub disc and being connected together so that said side parts rotate together and being connected to said friction lining carrier,
    several springs (5) beings provided in the rotational path between said side parts and said hub disc and being subjected to pressure if said friction lining carrier and said hub disc rotate relative to each other,
    at least one friction ring (7, 8) being arranged axially between said hub disc and one of said side parts and encircling said hub,
    a pressure ring (9) being arranged axially between said at least one friction ring and said adjacent one of said side parts and encircling said hub, means for biasing said pressure ring in an axially resilient manner, and
    several arms (11) spaced angularly apart around and projecting substantially radially outwardly from said pressure ring and having the radially outer ends thereof held on said friction lining carrier, said arms being stiff in the circumferential direction of said pressure ring, the improvement being characterized in that said arms are corrugated in the radial direction and, at their radially outer ends, are fastened to said adjacent side part in a play-free rigid manner.

2. A clutch disc as claimed in claim 1, characterized in that said side parts of said friction lining carrier are connected together through several axial separating rivets (6) which have, at least on the axial side of said pressure ring, a shoulder (14) which points to said adjacent side part and which merges in a rivet shank (13) penetrating this side part, and in that said radially outer end of each arm is rigidly clamped axially between said shoulder and said adjacent side part and has an opening (12), through which said rivet shank passes.

3. A clutch disc as claimed in one of claims 1 or 2, characterized in that said arms are formed integrally with said pressure ring.

4. A clutch disc as claimed in one of claims 1 or 2, characterized in that said arms and said pressure ring are components which are separately produced and are subsequently connected together so as to form a constructional unit.

5. A clutch disc as claimed in claim 1, characterized in that said side parts of said friction lining carrier are connected together through several axial separating rivets (6) which have, at least on the axial side of said pressure ring, a shoulder (14) which faces toward said adjacent side part and which merges in a rivet shank (13) penetrating this side part, and in that said radially outer end of each arm is rigidly clamped axially between said shoulder and said adjacent side part and has an opening (12), through which said rivet shank passes, and said means for biasing said pressure ring comprises a Belleville spring (10) arranged axially between said pressure ring and said adjacent side part with said Belleville spring annularly encircling said hub and axially resiliently biassing said pressure ring towards said friction ring.

6. A clutch disc as claimed in claim 1, characterized in that said side parts of said friction lining carrier are connected together through several axial separating rivets (6) which have, at least on the axial side of said pressure ring, a shoulder (14) which faces toward said adjacent side part and which merges in a rivet shank (13) penetrating the side part, and in that said radially outer end of each arm is rigidly clamped axially between said shoulder and said adjacent side part and has an opening (12), through which said rivet shank passes.

* * * * *